US010711968B2

(12) United States Patent
Hoshino

(10) Patent No.: US 10,711,968 B2
(45) Date of Patent: Jul. 14, 2020

(54) VEHICLE LIGHTING APPARATUS

(71) Applicant: STANLEY ELECTRIC CO., LTD., Tokyo (JP)

(72) Inventor: Shinya Hoshino, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 222 days.

(21) Appl. No.: 15/826,885

(22) Filed: Nov. 30, 2017

(65) Prior Publication Data
US 2018/0156414 A1 Jun. 7, 2018

(30) Foreign Application Priority Data

Dec. 1, 2016 (JP) .................. 2016-234210

(51) Int. Cl.
F21S 41/675 (2018.01)
F21S 41/147 (2018.01)
F21S 41/255 (2018.01)
F21S 41/14 (2018.01)
F21S 41/25 (2018.01)
(Continued)

(52) U.S. Cl.
CPC .............. F21S 41/675 (2018.01); B60Q 1/14 (2013.01); F21S 41/14 (2018.01); F21S 41/141 (2018.01); F21S 41/147 (2018.01); F21S 41/18 (2018.01); F21S 41/25 (2018.01); F21S 41/255 (2018.01); F21S 41/36 (2018.01); F21S 41/13 (2018.01);
(Continued)

(58) Field of Classification Search
USPC ........................................................ 362/467
See application file for complete search history.

(56) References Cited

U.S. PATENT DOCUMENTS

2013/0258689 A1* 10/2013 Takahira ................. F21V 14/00
362/465
2015/0191115 A1* 7/2015 Yamamura ............ F21S 41/143
315/82
2015/0377430 A1 12/2015 Bhakta

FOREIGN PATENT DOCUMENTS

DE 102015222188 B3 11/2016
FR 3008477 A1 1/2015
(Continued)

OTHER PUBLICATIONS

The extended European Search Report for the related European Patent Application No. 17204689.8 dated May 9, 2018.

Primary Examiner — Michael G Lee
Assistant Examiner — David Tardif
(74) Attorney, Agent, or Firm — Kenealy Vaidya LLP

(57) ABSTRACT

A vehicle lighting apparatus that illuminates a frontward direction of a vehicle includes: first and second light source units each having a light source main body and a light-focusing optical system that focuses light emitted from the light source main body; a reflection-type digital light deflection device that is configured by arranging a plurality of mirror elements each of which can be slanted around a rotation movement axis and each of which can be individually switched between an ON slanted state and an OFF slanted state and that reflects the light, focused by the first and second light source units, by the mirror element of the ON slanted state to form a reflection pattern; and a projection optical system that illuminates a frontward direction with light reflected by the reflection-type digital light deflection device, wherein light incident on the reflection-type digital light deflection device by the first and second light source units is overlapped.

20 Claims, 11 Drawing Sheets

(51) Int. Cl.
*F21S 41/36* (2018.01)
*F21S 41/141* (2018.01)
*B60Q 1/14* (2006.01)
*F21S 41/13* (2018.01)
*F21Y 113/20* (2016.01)
*F21Y 115/30* (2016.01)
*F21Y 115/10* (2016.01)

(52) U.S. Cl.
CPC ........ *F21Y 2113/20* (2016.08); *F21Y 2115/10* (2016.08); *F21Y 2115/30* (2016.08)

(56) References Cited

FOREIGN PATENT DOCUMENTS

| WO | 2014/002630 A1 | 1/2014 |
| WO | 2015033764 A1 | 3/2015 |

* cited by examiner

VEHICLE LIGHTING APPARATUS

CROSS-REFERENCE TO RELATED APPLICATION

Priority is claimed on Japanese Patent Application No. 2016-234210, filed on Dec. 1, 2016, the contents of which are incorporated herein by reference.

BACKGROUND

Field of the Invention

The present invention relates to a vehicle lighting apparatus.

Background

Vehicle lighting apparatuses are known which use a reflection-type digital light deflection device (DMD, Digital Mirror Device) that is capable of easily changing a light distribution pattern. PCT International Publication No. WO2014/002630 discloses a vehicle lighting apparatus that forms a plurality of focused light patterns on a DMD surface and causes projected focused light patterns to overlap with each other at a frontward position to thereby obtain a high light intensity.

SUMMARY

In the vehicle lighting apparatus of PCT International Publication No. WO2014/002630, it is necessary to focus light from a plurality of light sources, in the DMD surface having a small area, separately on a plurality of zones that are zoned to have a smaller area. Therefore, there is a problem in that an assembly with high accuracy is required.

An object of an aspect of the present invention is to provide a vehicle lighting apparatus that is capable of obtaining a high illumination intensity and easily achieving a variety of light distribution patterns.

An aspect of the present invention is a vehicle lighting apparatus that illuminates a frontward direction of a vehicle, the apparatus including: first and second light source units each having a light source main body and a light-focusing optical system that focuses light emitted from the light source main body; a reflection-type digital light deflection device that is configured by arranging a plurality of mirror elements each of which can be slanted around a rotation movement axis and each of which can be individually switched between an ON slanted state and an OFF slanted state and that reflects the light, focused by the first and second light source units, by the mirror element of the ON slanted state to form a reflection pattern; and a projection optical system that illuminates a frontward direction with light reflected by the reflection-type digital light deflection device, wherein light incident on the reflection-type digital light deflection device by the first and second light source units is overlapped.

According to the configuration described above, light emitted from the first and second light source units is overlapped at the reflection-type digital light deflection device. Therefore, it is possible to change the shape of an illumination region of the vehicle lighting apparatus by the reflection-type digital light deflection device, and since the illumination intensity can be increased by overlapping a plurality of light distribution patterns with each other, it is possible to greatly change the illumination intensity of each part of the illumination region.

Further, the light emitted from the first and second light source units is overlapped at the reflection-type digital light deflection device and shares one reflection pattern. Accordingly, a plurality of reflection-type digital light deflection devices are not required, and it is possible to achieve a simple and low-cost vehicle lighting apparatus. Further, in comparison with the vehicle lighting apparatus of PCT International Publication No. WO2014/002630, it is not necessary to divide the plane of the reflection-type digital light deflection device into a plurality of regions, and an assembly with high accuracy is not required.

In the vehicle lighting apparatus described above, an area of an illumination region of light that is incident on the reflection-type digital light deflection device by the first light source unit may be larger than an area of an illumination region of light that is incident on the reflection-type digital light deflection device by the second light source unit.

According to the configuration described above, a light distribution pattern that is formed by the second light source unit can be overlapped on the inside of a light distribution pattern that is fainted by the first light source unit. Accordingly, it is possible to easily achieve a light distribution pattern in which the illumination intensity is locally enhanced.

In the vehicle lighting apparatus described above, the light source main body of the first light source unit may be a light-emitting diode light source, and the light source main body of the second light source unit may be a laser light source.

In general, the laser light source has a small light emission point and a high light density (high brightness) compared to the light-emitting diode light source. According to the configuration described above, by using the light-emitting diode light source for the first light source unit, the light distribution pattern that is formed by the first light source unit can be made wide light distribution. On the other hand, by using the laser light source for the second light source unit, it is possible to achieve spot light distribution having a high illumination intensity by the light distribution pattern that is formed by the second light source unit. Accordingly, by overlapping the light distribution pattern by the first light source unit with the light distribution pattern by the second light source unit, it is possible to easily achieve a wide light distribution pattern in which the illumination intensity is locally enhanced.

In the vehicle lighting apparatus described above, an image magnification ratio of the light-focusing optical system of the first light source unit may be larger than an image magnification ratio of the light-focusing optical system of the second light source unit.

According to the configuration described above, by overlapping the light distribution pattern by the first light source unit with the light distribution pattern by the second light source unit, it is possible to easily achieve a wide light distribution pattern in which the illumination intensity is locally enhanced.

In the vehicle lighting apparatus described above, a first imaginary plane that passes through a center of the reflection-type digital light deflection device and that is in parallel with the rotation movement axis of the mirror element and a normal direction of the mirror element of the ON slanted state may be set, the light-focusing optical systems of the first and second light source units may be arranged in one of two regions that are zoned by the first imaginary plane, and the projection optical system may be arranged in another of the two regions that are zoned by the first imaginary plane.

According to the configuration described above, it is possible to achieve a configuration in which light is introduced to the mirror element from one side with respect to the rotation direction of the mirror element and is reflected to another side. Therefore, it is possible to increase a variation of a reflection angle associated with the rotation of the mirror element, and it is possible to clearly switch between the ON slanted state and the OFF slanted state of the mirror element.

In the vehicle lighting apparatus described above, a second imaginary plane that passes through the center of the reflection-type digital light deflection device and that is orthogonal to the first imaginary plane may be set, the light-focusing optical system of the first light source unit may be arranged in one of two regions that are zoned by the second imaginary plane, and the light-focusing optical system of the second light source unit may be arranged in another of the two regions that are zoned by the second imaginary plane.

According to the configuration described above, the first and second light source units can be arranged to be displaced in the rotation movement axis direction of the mirror element. Thereby, both of the light-focusing optical systems of the first and second light source units can be arranged close to the reflection-type digital light deflection device. Accordingly, the light-focusing optical systems of the first and second light source units can reliably focus light on the reflection-type digital light deflection device.

In the vehicle lighting apparatus described above, a second imaginary plane that passes through the center of the reflection-type digital light deflection device and that is orthogonal to the first imaginary plane may be set, and the light-focusing optical systems of the first and second light source units may be arranged on the second imaginary plane.

According to the configuration described above, the light-focusing optical systems of the first and second light source units and the projection optical system can be arranged to be aligned along the second imaginary plane, and it is possible to achieve a vehicle lighting apparatus having a small dimension in a direction that is orthogonal to the second imaginary plane.

In the vehicle lighting apparatus described above, the projection optical system may have a lens body having a shape that includes a notched part in plan view, and the light-focusing optical system may be arranged at the notched part.

According to the configuration described above, the projection optical system has the notched lens body. Thereby, the light-focusing optical system and the projection optical system can be arranged close to each other, and it is possible to achieve a compact vehicle lighting apparatus.

The vehicle lighting apparatus described above may have three or more light source units each having a light source main body and a light-focusing optical system that focuses light emitted from the light source main body.

According to the configuration described above, three or more light distribution patterns formed by using the three or more light source units are overlapped with one another, and thereby, it is possible to enhance an effect of increasing the illumination intensity.

In the vehicle lighting apparatus described above, at least one of the light source units may emit non-visible light.

According to the configuration described above, light emitted from the light source unit that emits the non-visible light can be used for sensing of the frontward direction.

Further, it is not necessary to separately provide a non-visible light irradiation device for sensing the frontward direction, and it is possible to achieve a low-cost sensing device.

The vehicle lighting apparatus described above may include a control part that controls a slant mode of the mirror element of the reflection-type digital light deflection device in response to travel circumstances of the vehicle.

According to the configuration described above, it is possible to select and achieve a variety of light distribution patterns in response to travel circumstances of the vehicle, and it is possible to perform light distribution that is suitable for peripheral circumstances.

The vehicle lighting apparatus described above may include an object detection part that detects an object which is present at a frontward position of the vehicle, wherein the control part may control a slant mode of the mirror element of the reflection-type digital light deflection device based on a detection condition of the object detection part.

According to the vehicle lighting apparatus described above, the control part that forms a light distribution pattern based on the detection condition of the object detection part is provided, and therefore, it is possible to adjust the light distribution pattern appropriately in response to frontward circumstances.

According to the aspect of the present invention, it is possible to provide a vehicle lighting apparatus that is capable of obtaining a high illumination intensity and easily achieving a variety of light distribution patterns.

DESCRIPTION OF THE EMBODIMENTS

Figure 1:
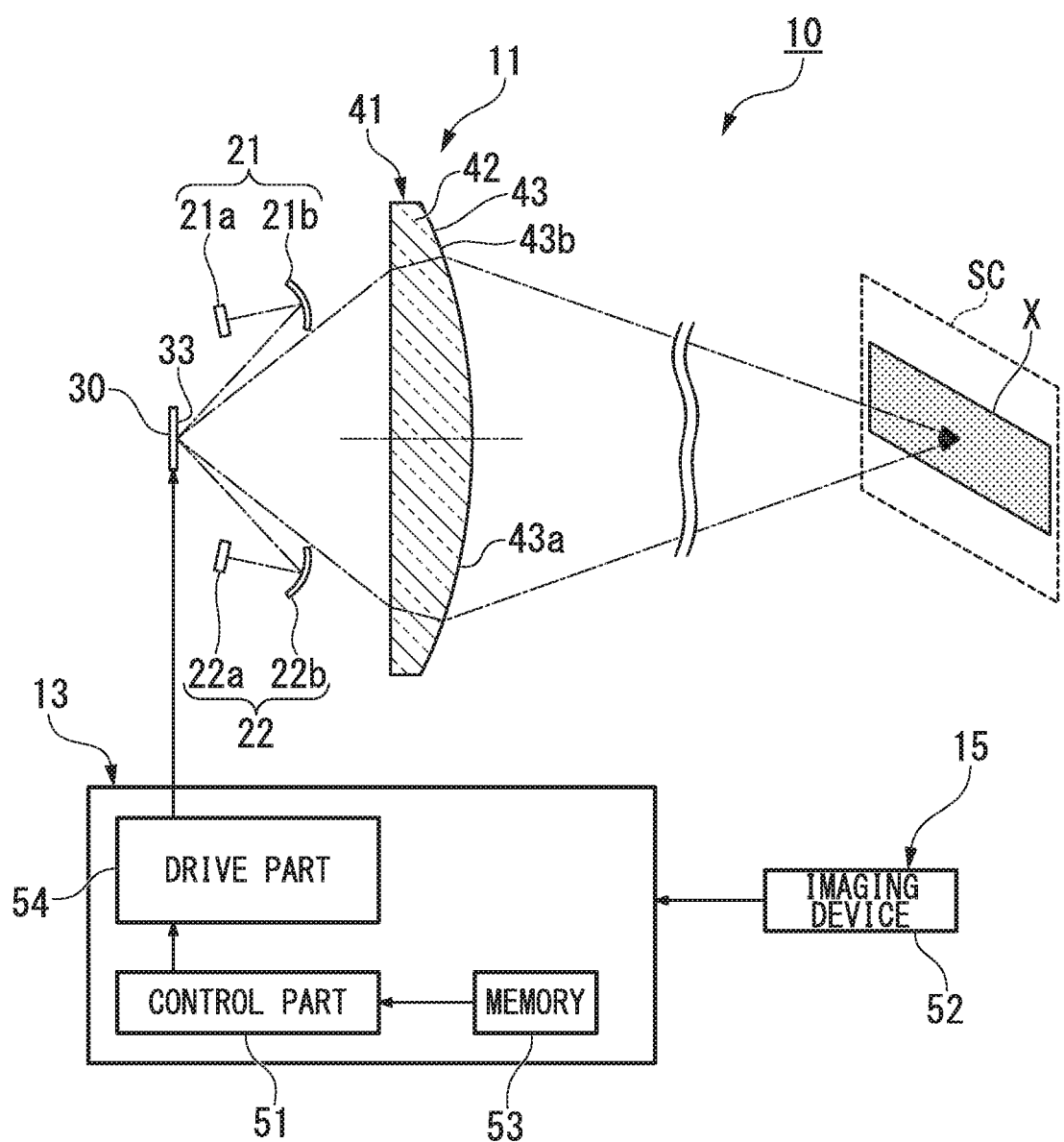
FIG. 1 is a schematic view showing a vehicle lighting apparatus of a first embodiment.

Hereinafter, a vehicle lighting apparatus according to an embodiment is described with reference to the drawings.

In the drawings used in the following description, there may be a case in which, for ease of understanding the features, the featured part is shown to be enlarged, and the dimension ratio of each component or the like is not always the same as an actual one.

In the drawings, an XYZ coordinate system is shown appropriately as a three-dimensional orthogonal coordinate system. In the XYZ coordinate system, a Y-axis direction is an upward and downward direction (vertical direction), and a +Y direction is the upward direction. A Z-axis direction is a front-to-rear direction, and a +Z direction is the front direction (frontward direction). An X-axis direction is a right-to-left direction. The frontward direction means a light emission direction of the vehicle lighting apparatus and does not necessarily limit an attitude in which the vehicle lighting apparatus is attached.

First Embodiment

Figure 2:
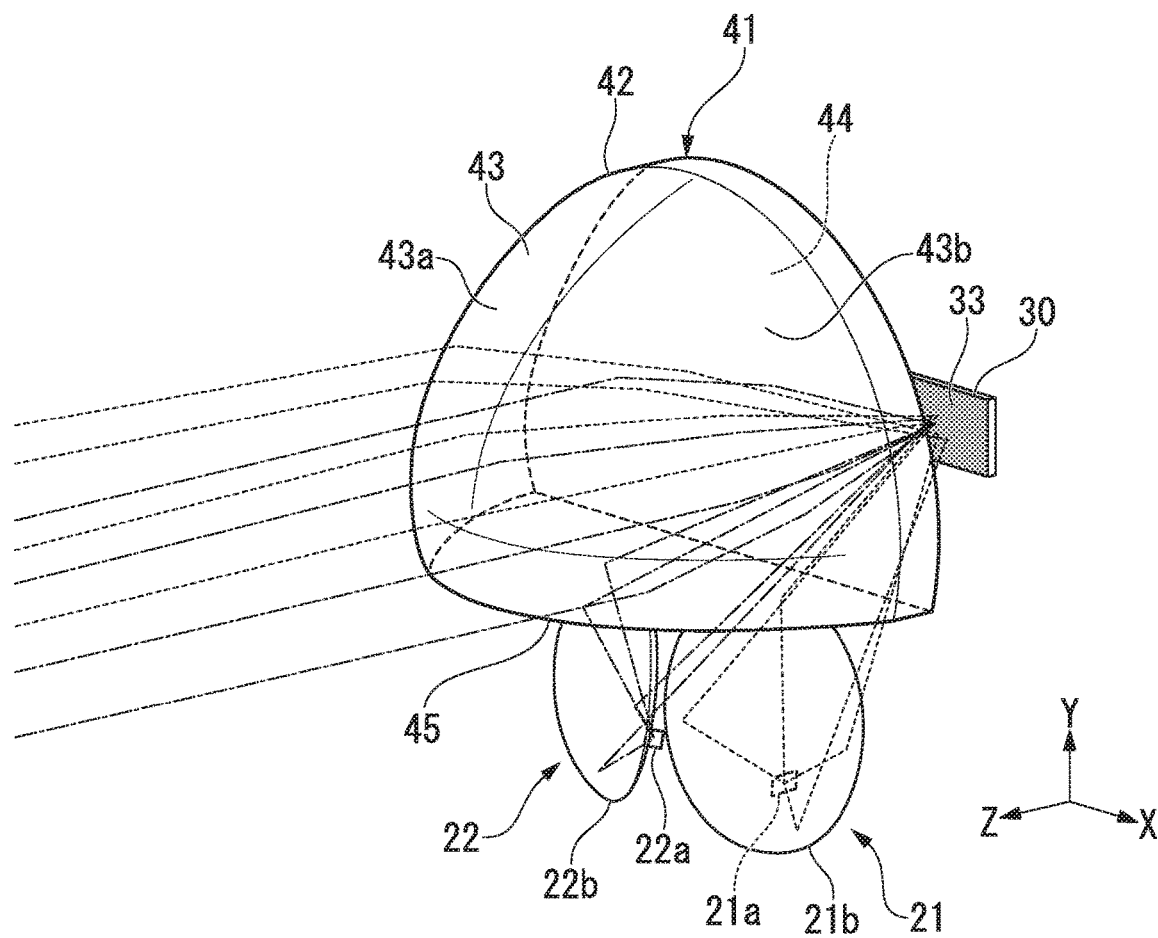
FIG. 2 is a perspective view of a projection module of the first embodiment.

FIG. 1 is a schematic view showing a vehicle lighting apparatus 10 according to a first embodiment. FIG. 2 is a perspective view of a projection module 11 of the vehicle lighting apparatus 10.

The vehicle lighting apparatus 10 of the present embodiment is a light distribution variable lighting apparatus that illuminates a frontward direction of a vehicle while changing a light distribution pattern automatically in response to a position of a frontward object such as an oncoming vehicle.

The vehicle lighting apparatus 10 includes the projection module 11, a control device 13 that controls the projection module 11, and an imaging device 15 that detects frontward circumstances and that transmits the frontward circumstances to the control device 13.

The projection module 11 includes a first light source unit 21, a second light source unit 22, a reflection-type digital light deflection device 30 having a reflection control surface 33, and a projection optical system 41. The first light source unit 21 has a light source main body 21a and a light-focusing optical system 21b. Similarly, the second light source unit 22 has a light source main body 22a and a light-focusing optical system 22b. In the first light source unit 21, the light source main body 21a faces the light-focusing optical system 21b. Similarly, in the second light source unit 22, the light source main body 22a faces the light-focusing optical system 22b.

The light source main body 21a emits light toward the light-focusing optical system 21b. The light source main body 22a emits light toward the light-focusing optical system 22b. A light-emitting diode (LED) light source, a laser light source, and the like can be employed as the light source main bodies 21a, 22a. The light source main bodies 21a, 22a may be a device that emits non-visible light.

The light-focusing optical system 21b of the first light source unit 21 and the light-focusing optical system 22b of the second light source unit 22 are aligned along the X-axis direction. The light-focusing optical system 21b focuses light that is emitted from the light source main body 21a on the reflection control surface 33 of the reflection-type digital light deflection device 30. The light-focusing optical system 22b focuses light that is emitted from the light source main body 22a on the reflection control surface 33 of the reflection-type digital light deflection device 30. The light-focusing optical systems 21b, 22b of the present embodiment are concave mirrors. However, the light-focusing optical systems 21b, 22b may be condenser lenses. The light-focusing optical systems 21b, 22b may cause a focused light size to be the size of the reflection control surface 33 in order to effectively use the entire surface of the reflection control surface 33 of the reflection-type digital light deflection device 30. The light-focusing optical systems 21b, 22b may be preferably configured so as to be capable of illuminating the reflection control surface 33 of the reflection-type digital light deflection device 30 as uniformly as possible.

The focal length of the light-focusing optical system 21b of the first light source unit 21 is matched with the focal length of the light-focusing optical system 22b of the second light source unit 22. The distance to the light-focusing optical system 21b of the first light source unit 21 from the reflection-type digital light deflection device 30 is matched with the distance to the light-focusing optical system 22b of the second light source unit 22 from the reflection-type digital light deflection device 30. Accordingly, the image magnification ratio of the light-focusing optical system 21b of the first light source unit 21 is matched with the image magnification ratio of the light-focusing optical system 22b of the second light source unit 22.

The reflection-type digital light deflection device 30 reflects part of the light emitted from the first light source unit 21 and the second light source unit 22 at the reflection control surface 33 toward the projection optical system 41.

Figure 3:
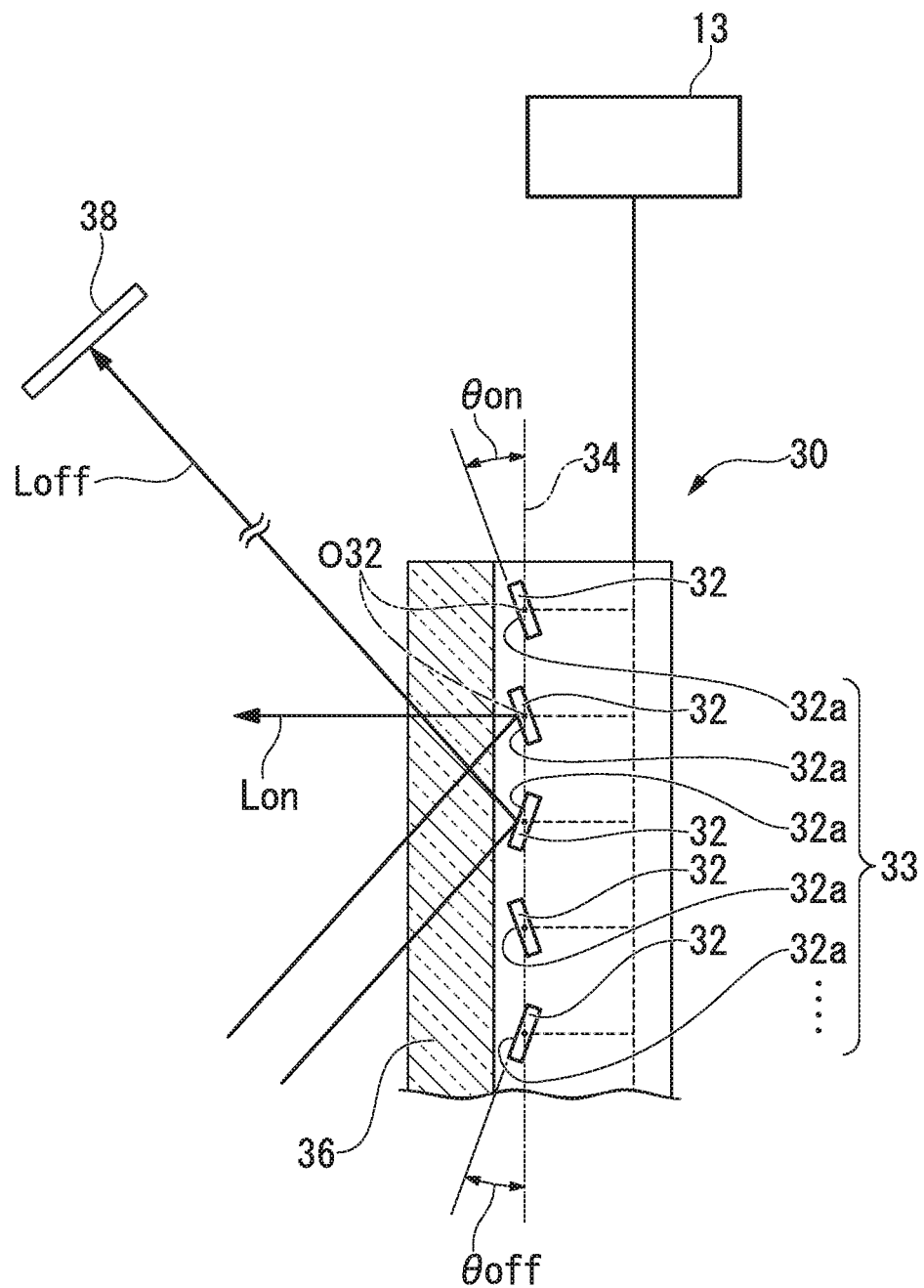
FIG. 3 is a schematic cross-sectional view of a reflection-type digital light deflection device of the first embodiment.

FIG. 3 is a schematic cross-sectional view of the reflection-type digital light deflection device 30. The reflection-type digital light deflection device 30 has a plurality of micro mirror elements (optical elements) 32 arranged in a matrix along an arrangement plane 34 and a transparent cover plate 36 arranged on a frontward side of a reflection surface 32a of the mirror element 32. The reflection surfaces 32a of the mirror elements 32 form the reflection control surface 33 as a whole. The arrangement plane 34 in the present embodiment is a plane that is parallel to the XY plane. A rotation movement axis O32 extends in parallel with the X-axis.

The mirror element 32 can be slanted around the rotation movement axis O32. Each of the plurality of mirror elements 32 is individually switched between an ON slanted state and an OFF slanted state by a voltage application from the control device 13. The mirror element 32 is slanted at an ON slant angle θon with respect to the arrangement plane 34 in the ON slanted state. The mirror element 32 is slanted at an OFF slant angle θoff with respect to the arrangement plane 34 in the OFF slanted state. The ON slant angle θon and the OFF slant angle θoff have substantially the same absolute value and a different positive/negative sign from each other.

The mirror element 32 reflects light Lon emitted from the first light source unit 21 and the second light source unit 22 toward the projection optical system 41 in the ON slanted state. The light Lon that is reflected by the mirror element 32 of the ON slanted state forms a predetermined reflection pattern.

The mirror element 32 emits light Loff emitted from the first light source unit 21 and the second light source unit 22 toward a light shield member 38 in the OFF slanted state. In the present embodiment, a pair of light shield members 38 is provided. In the drawings, one of the pair of light shield members 38 is not shown. One of the pair of light shield members 38 blocks light that is emitted from the first light source unit 21 and that is reflected by the mirror element 32 of the OFF slanted state. Another of the pair of light shield members 38 blocks light that is emitted from the second light source unit 22 and that is reflected by the mirror element 32 of the OFF slanted state.

The reflection-type digital light deflection device 30 is connected to the control device 13. The reflection-type digital light deflection device 30 reflects light focused by the first light source unit 21 and the second light source unit 22 by the mirror element 32 of the ON slanted state and forms a reflection pattern. The reflection-type digital light deflection device 30 can change the reflection pattern with time in response to the voltage application by the control device 13.

Figure 4:
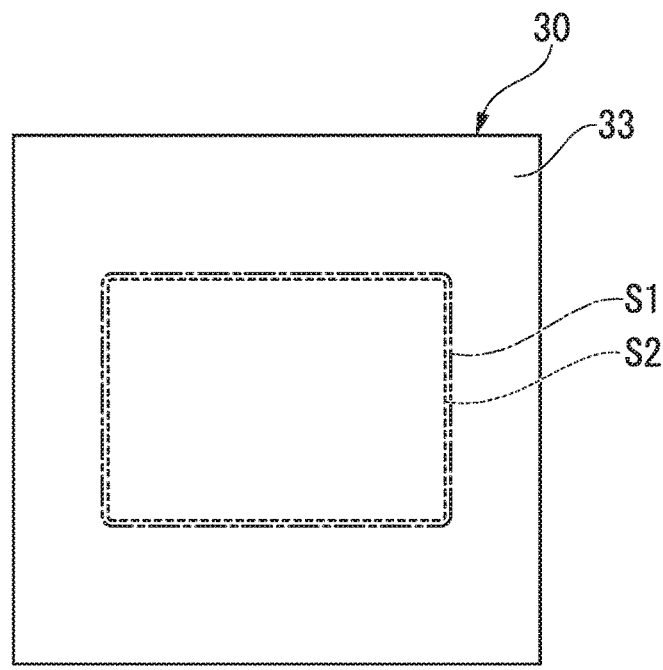
FIG. 4 is a front view of the reflection-type digital light deflection device of the first embodiment.

FIG. 4 is a front view of the reflection-type digital light deflection device 30 and is a schematic view showing light that is incident on the reflection control surface 33.

In an illumination region of light that is incident on the reflection control surface 33, a region that is formed by the light emitted from the first light source unit 21 is a first illumination region S1, and a region that is formed by the light emitted from the second light source unit 22 is a second illumination region S2. In the present embodiment, the image magnification ratio of the light-focusing optical system 21b of the first light source unit 21 is matched with the image magnification ratio of the light-focusing optical system 22b of the second light source unit 22. Accordingly, the illumination area of the first illumination region S1 is substantially matched with the illumination area of the second illumination region S2.

As shown in FIG. 4, the first illumination region S1 and the second illumination region S2 are overlapped entirely with each other in the reflection control surface 33. That is, light that is incident on the reflection-type digital light deflection device 30 by the first light source unit 21 is overlapped with light that is incident on the reflection-type digital light deflection device 30 by the second light source unit 22. Accordingly, a reflection pattern that is formed by light which is emitted from the first light source unit 21 is matched with a reflection pattern that is formed by light which is emitted from the second light source unit 22.

The projection optical system 41 irradiates a frontward imaginary screen SC with light from the reflection-type digital light deflection device 30. The projection optical system 41 has a lens body 42. As shown in FIG. 2, the lens body 42 has an incidence surface 44 having a planar shape and an emission surface 43 having a convex shape.

The incidence surface 44 is arranged to face the reflection-type digital light deflection device 30. The reflection pattern emitted from the reflection-type digital light deflection device 30 is incident on the incidence surface 44 to enter the inside of the lens body 42.

The emission surface 43 is directed in the frontward direction and projects the light that is incident on the incidence surface 44 in the frontward direction. The emission surface 43 is zoned into a first emission region 43a and a second emission region 43b that are aligned in the X-axis direction. The first emission region 43a and the second emission region 43b have a symmetric shape in the right-to-left direction. The first emission region 43a emits a reflection pattern that is formed, by the reflection-type digital light deflection device 30, of light emitted from the first light source unit 21. On the other hand, the second emission region 43b emits a reflection pattern that is formed, by the reflection-type digital light deflection device 30, of light emitted from the second light source unit 22. As shown in FIG. 1, light emitted from the first and second emission regions 43a, 43b is overlapped on the frontward imaginary screen SC and forms a light distribution pattern X.

A notch part 45 is provided on the lens body 42. That is, the lens body 42 is formed in a shape that includes a notched part in plan view. The notch part 45 is arranged at a position on the −Y-axis side of the lens body 42. The light-focusing optical system 21b of the first light source unit 21 and the light-focusing optical system 22b of the second light source unit 22 are arranged at the notch part 45.

In the present embodiment, the projection optical system 41 that is constituted of a single lens body 42 is shown as an example; however, the projection optical system 41 may have a plurality of lens bodies that are aligned along the optical axis direction.

Next, the arrangement of each part of the projection module 11 is described in further detail.

Figure 5:
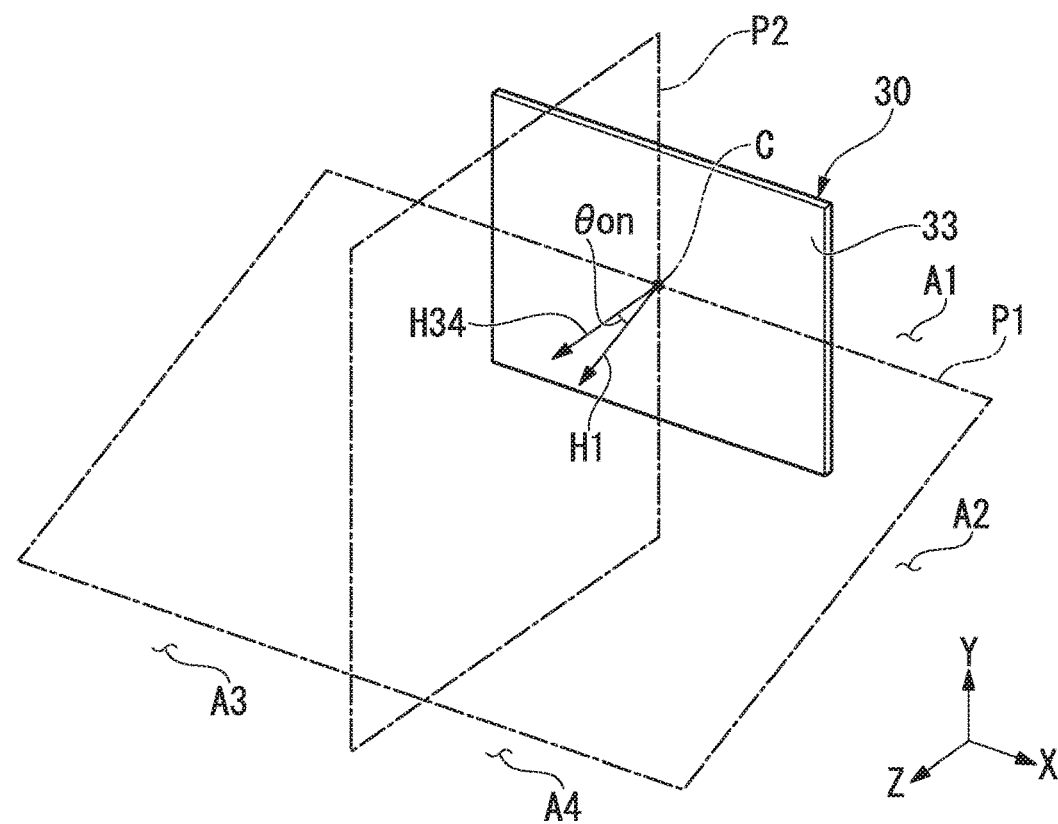
FIG. 5 is a perspective view showing a frontward space of the reflection-type digital light deflection device of the first embodiment.
Figure 6:
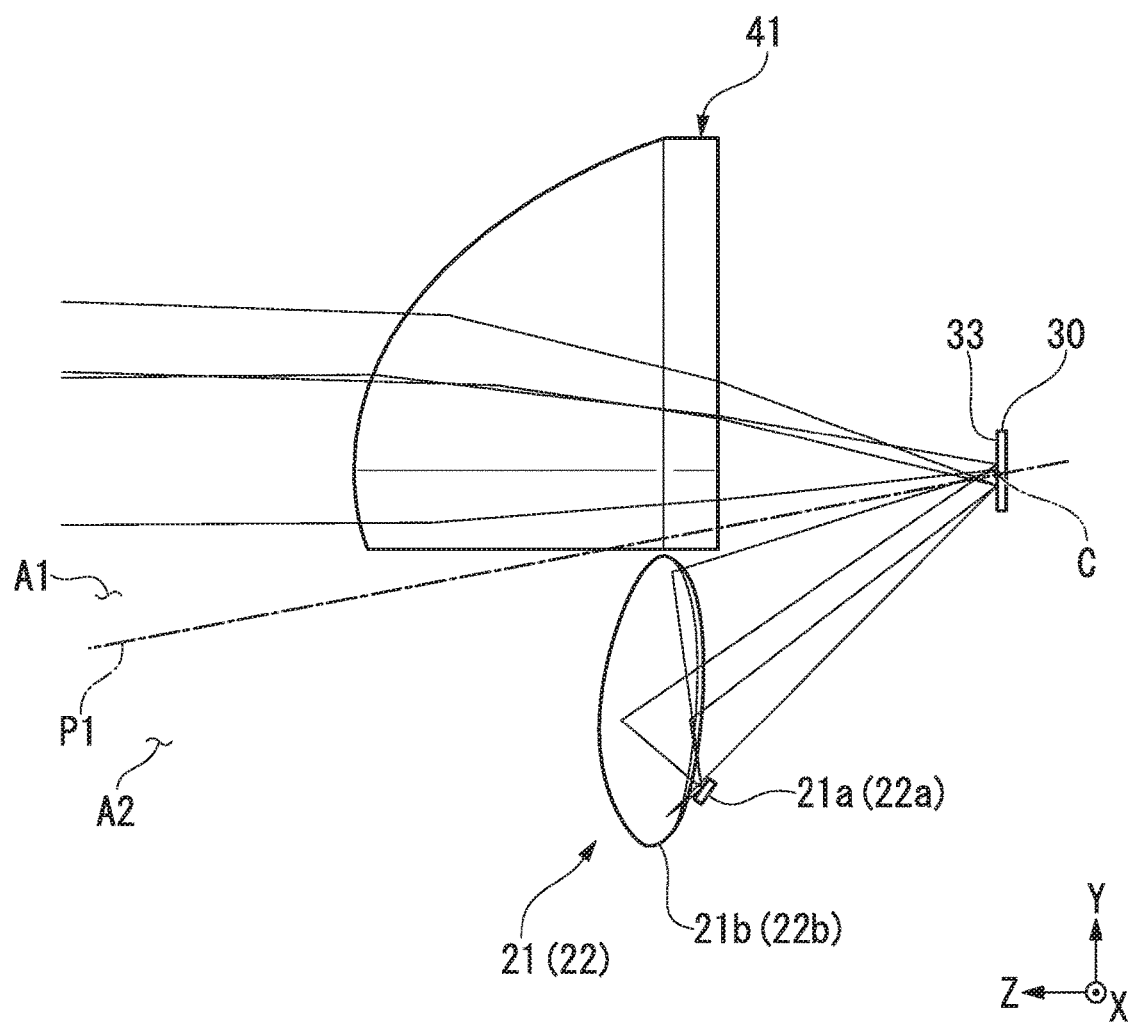
FIG. 6 is a side view of a projection module of the first embodiment.
Figure 7:
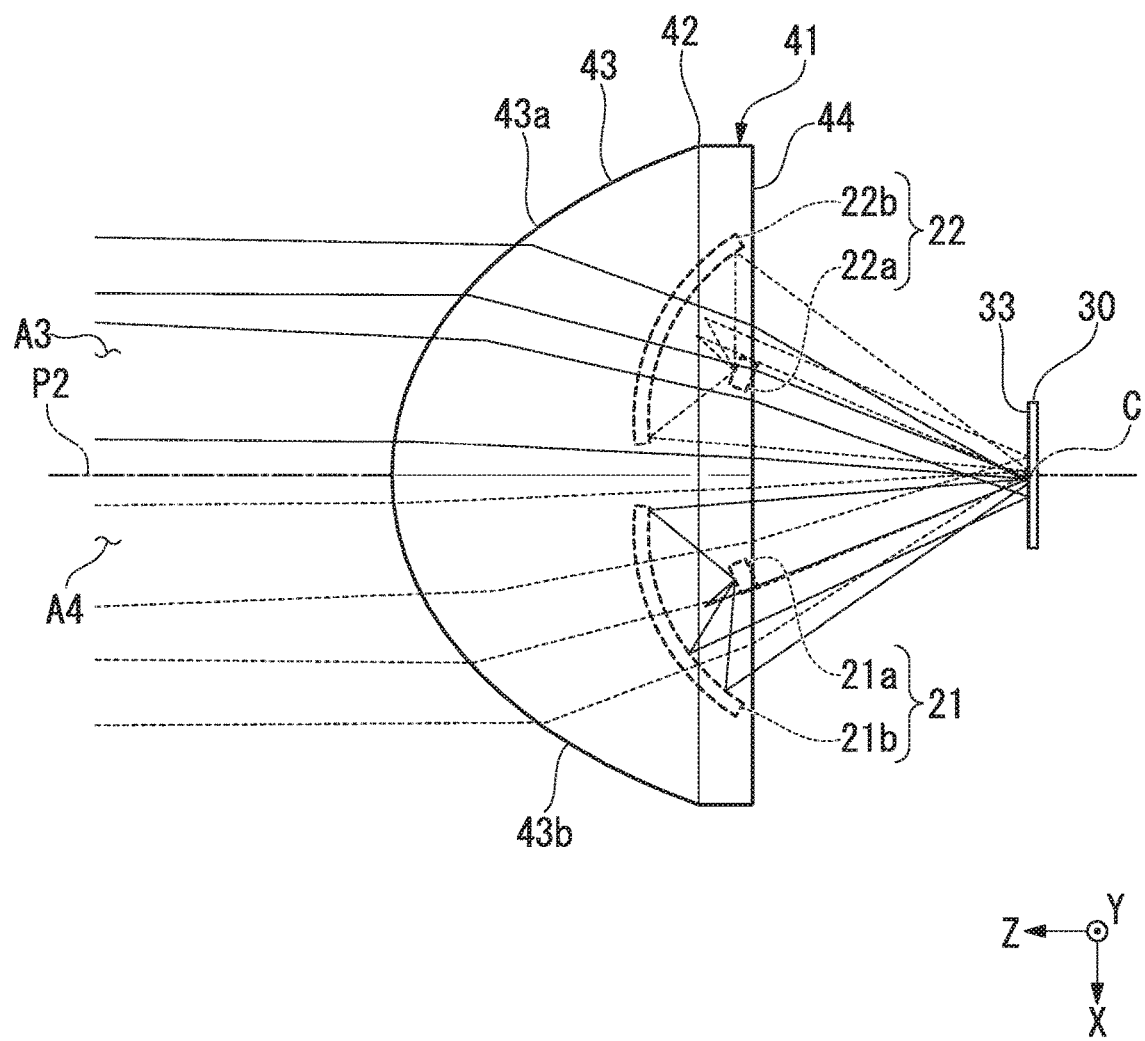
FIG. 7 is a plan view of the projection module of the first embodiment.

FIG. 5 is a perspective view showing a frontward space of the reflection-type digital light deflection device 30. FIG. 6 is a side view of the projection module 11. FIG. 7 is a plan view of the projection module 11.

As shown in FIG. 5 and FIG. 6, a first imaginary plane P1 that passes through the center C of the reflection-type digital light deflection device 30 and that is in parallel with the rotation movement axis O32 of the mirror element 32 and the normal direction of the mirror element 32 of the ON state is defined. The first imaginary plane P1 is slanted by the ON slanted angle θon around the X-axis with respect to the X-Z plane. The first imaginary plane P1 divides the frontward space of the reflection-type digital light deflection device 30 into an upper region A1 and a lower region A2. In FIG. 5, a normal line H34 of the arrangement plane 34 of the reflection-type digital light deflection device 30 and a normal line H1 of the mirror element 32 of the ON state are shown. The absolute value of an angle formed of the normal line H34 of the arrangement plane 34 and the normal line H1 of the mirror element 32 of the ON state is the ON slanted angle θon.

As shown in FIG. 5 and FIG. 7, a second imaginary plane P2 that passes through the center C of the reflection-type digital light deflection device 30 and that is orthogonal to the first imaginary plane P1 is defined. The second imaginary plane P2 is a plane that is parallel to the Y-Z plane. The second imaginary plane P2 divides the space in front of the reflection-type digital light deflection device 30 into a right region A3 and a left region A4.

As shown in FIG. 6, the light source main body 21a and the light-focusing optical system 21b of the first light source unit 21 are arranged in one (lower region A2) of two regions that are zoned by the first imaginary plane P1. The light source main body 22a and the light-focusing optical system 22b of the second light source unit 22 are arranged in the one (lower region A2) of the two regions that are zoned by the first imaginary plane P1. The projection optical system 41 is arranged in another (upper region A1) of the two regions that are zoned by the first imaginary plane P1.

As shown in FIG. 7, the light source main body 21a and the light-focusing optical system 21b of the first light source unit 21 are positioned in the left region A4. On the other hand, the light source main body 22a and the light-focusing optical system 22b of the second light source unit 22 are positioned in the right region A3.

The first emission region 43a of the projection optical system 41 is positioned in the right region A3. The second emission region 43b of the projection optical system 41 is positioned in the left region A4.

With reference back to FIG. 1, a configuration of the vehicle lighting apparatus 10 is described.

The imaging device 15 has an object detection part 52 that detects, by capturing an image of a frontward direction of a vehicle and processing the image, the position, size, and the like of an object that is present in the frontward direction of the vehicle and transmits the detection condition to a control part 51.

The control device 13 has a memory 53 in which control information of a variety of light distribution patterns and the like are set in advance, the control part 51 that generates a control signal based on information from the memory 53 and a signal from the imaging device 15, and a drive part 54 that drives the reflection-type digital light deflection device 30 based on the control signal.

The control device 13 controls a slant mode of the mirror element 32 of the reflection-type digital light deflection device 30 in response to travel circumstances of the vehicle. The control device 13 controls the slant mode of each mirror element 32 of the reflection-type digital light deflection device 30 based on the detection condition of the object detection part 52 to thereby form a light distribution pattern.

According to the present embodiment, light emitted from the first light source unit 21 and the second light source unit 22 is overlapped at the reflection control surface 33 of the reflection-type digital light deflection device 30. Therefore, it is possible to change the shape of the illumination region of the vehicle lighting apparatus 10 by the reflection-type digital light deflection device 30, and since the illumination intensity can be increased by overlapping a plurality of light distribution patterns with each other, it is possible to greatly change the illumination intensity of each part of the illumination region.

Further, according to the present embodiment, the light emitted from the first light source unit 21 and the second light source unit 22 is overlapped at the reflection control surface 33 of the reflection-type digital light deflection device 30 and shares one reflection pattern. Accordingly, a plurality of reflection-type digital light deflection devices 30 are not required, and it is possible to achieve a simple and low-cost vehicle lighting apparatus 10.

Further, according to the present embodiment, the light-focusing optical system 21b of the first light source unit 21 and the light-focusing optical system 22b of the second light source unit 22 are arranged in the lower region A2 of the two regions that are zoned by the first imaginary plane P1, and the projection optical system 41 is arranged in the upper region A1 of the two regions that are zoned by the first imaginary plane P1. Thereby, it is possible to achieve a configuration in which light is introduced to the mirror element 32 from one side with respect to the rotation direction of the mirror element 32 and is reflected to another side. Accordingly, it is possible to increase a variation of a reflection angle associated with the rotation of the mirror element 32, and it is possible to further clearly form a reflection pattern according to the ON slanted state and the OFF slanted state of the mirror element 32.

The present embodiment is described using an example in which the projection optical system 41 is arranged in the upper region A1. However, as long as an effective emission surface (that is, an emission surface through which an optical path actually passes) of the projection optical system 41 is arranged in the upper region A1, it is possible to provide the effects described above.

Further, according to the present embodiment, the light-focusing optical system 21b of the first light source unit 21 is arranged in the left region A4 of the two regions that are zoned by the second imaginary plane P2, and the light-focusing optical system 22b of the second light source unit 22 is arranged in the right region A3 of the two regions that are zoned by the second imaginary plane P2. Thereby, the first light source unit 21 and the second light source unit 22 can be arranged to be displaced in the rotation movement axis O32 direction of the mirror element 32. Accordingly, both of the light-focusing optical system 21b of the first light source unit 21 and the light-focusing optical system 22b of the second light source unit 22 can be arranged close to the reflection-type digital light deflection device 30, and light can be reliably focused on the reflection-type digital light deflection device 30 by the light-focusing optical system 21b of the first light source unit 21 and the light-focusing optical system 22b of the second light source unit 22.

The present embodiment is described using an example in which two light source units (the first light source unit 21 and the second light source unit 22) are included; however, the vehicle lighting apparatus 10 may have three or more light source units. In this case, as long as at least two of the three or more light source units satisfy the positional relationship described above, it is possible to provide the effects described above.

Further, according to the present embodiment, the notch part 45 is provided at the projection optical system 41, and the light-focusing optical systems 21b, 22b are arranged at the notch part 45. Thereby, the light-focusing optical systems 21b, 22b and the projection optical system 41 can be arranged close to each other, and it is possible to achieve a compact vehicle lighting apparatus 10.

Further, according to the present embodiment, the control part 51 that controls a slant mode of the mirror element 32 in response to travel circumstances of the vehicle is included, and it is possible to select and achieve a variety of light distribution patterns and to perform light distribution that is suitable for peripheral circumstances. Further, according to the present embodiment, when the control part 51 is connected to the object detection part 52, it is possible to form a light distribution pattern based on the detection condition of the object detection part.

Modified Example 1 and Modified Example 2 of the First Embodiment

Figure 8:
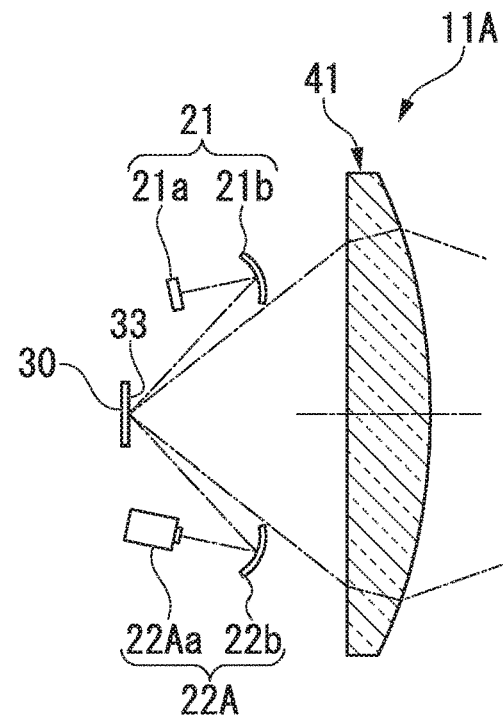
FIG. 8 is a schematic view of a projection module of modified example 1 of the first embodiment.
Figure 9:
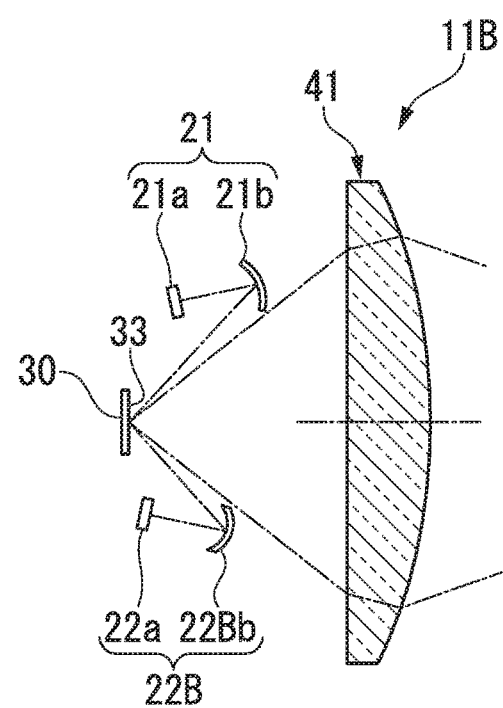
FIG. 9 is a schematic view of a projection module of modified example 2 of the first embodiment.

FIG. 8 is a schematic view of a projection module 11A of modified example 1 that is applicable to the embodiment described above. FIG. 9 is a schematic view of a projection module 11B of modified example 2.

The same reference numerals are given to constituents having the same configuration as those of the embodiment described above, and description of the constituents is omitted.

The projection module 11A of modified example 1 shown in FIG. 8 has a first light source unit 21, a second light source unit 22A, a reflection-type digital light deflection device 30, and a projection optical system 41.

In modified example 1, the first light source unit 21 has a light source main body 21a that is constituted of a light-emitting diode light source and a light-focusing optical system 21b. On the other hand, the second light source unit 22A has a light source main body 22Aa formed of a laser light source and a light-focusing optical system 22b.

In general, the laser light source has a small light emission point and a high light density (high brightness) compared to the light-emitting diode light source. According to the configuration of modified example 1, by using the light-emitting diode light source for the first light source unit 21, the light distribution pattern that is formed by the first light source unit 21 can be made wide light distribution. On the other hand, by using the laser light source for the second light source unit 22A, it is possible to achieve spot light distribution having a high illumination intensity by the light distribution pattern that is formed by the second light source unit 22A.

The projection module 11B of modified example 2 shown in FIG. 9 has a first light source unit 21, a second light source unit 22B, a reflection-type digital light deflection device 30, and a projection optical system 41.

In modified example 2, the first light source unit 21 has a light source main body 21*a* and a light-focusing optical system 21*b*. The second light source unit 22B has a light source main body 22*a* and a light-focusing optical system 22B*b*. The curvature radius of the light-focusing optical system 21*b* of the first light source unit 21 is larger than the curvature radius of the light-focusing optical system 22B*b* of the second light source unit 22B. Therefore, the image magnification ratio of the light-focusing optical system 21*b* of the first light source unit 21 is larger than the image magnification ratio of the light-focusing optical system 22B*b* of the second light source unit 22B.

According to the configuration of modified example 2, the second light source unit 22B can focus light by a smaller image magnification ratio than the first light source unit 21 and can irradiate the reflection-type digital light deflection device 30 with the light.

Figure 10:
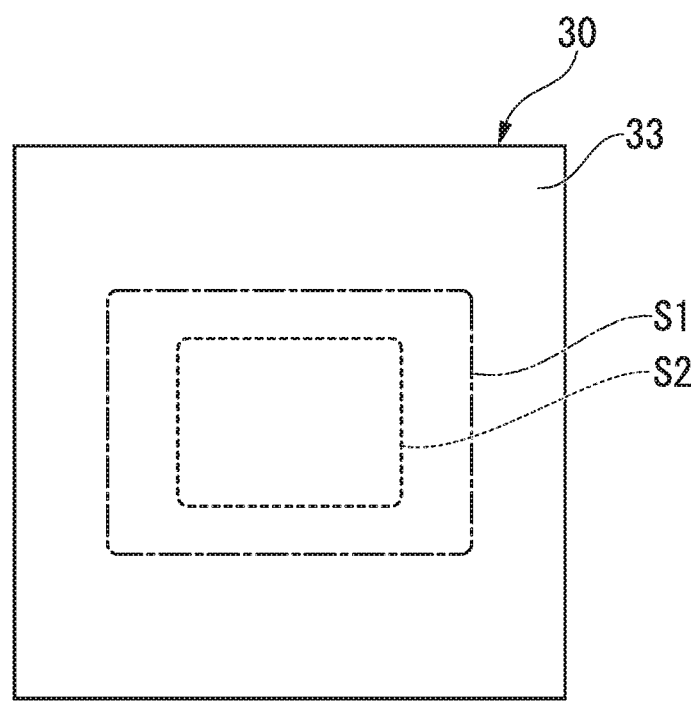
FIG. 10 is a front view of a reflection-type digital light deflection device in modified example 1 and modified example 2 of the first embodiment.

FIG. 10 is a front view of the reflection-type digital light deflection device 30 in modified example 1 and modified example 2 and is a schematic view showing light that is incident on the reflection control surface 33. In FIG. 10, a region that is formed by the light emitted from the first light source unit 21 is a first illumination region S1, and a region that is formed by the light emitted from the second light source units 22A, 22B is a second illumination region S2.

In modified example 1 and modified example 2, the area of the first illumination region S1 of light that is incident on the reflection-type digital light deflection device 30 by the first light source unit 21 is greater than the area of the second illumination region S2 of light that is incident on the reflection-type digital light deflection device 30 by the second light source units 22A, 22B. The second illumination region S2 is included inside the first illumination region S1. A part having a locally high brightness corresponding to the second illumination region S2 is formed in the reflection pattern formed in modified example 1 and modified example 2. Thereby, the projection module 11A of modified example 1 and the projection module 11B of modified example 2 project a light distribution pattern having a locally enhanced illumination intensity in the frontward direction.

Second Embodiment

Figure 11:
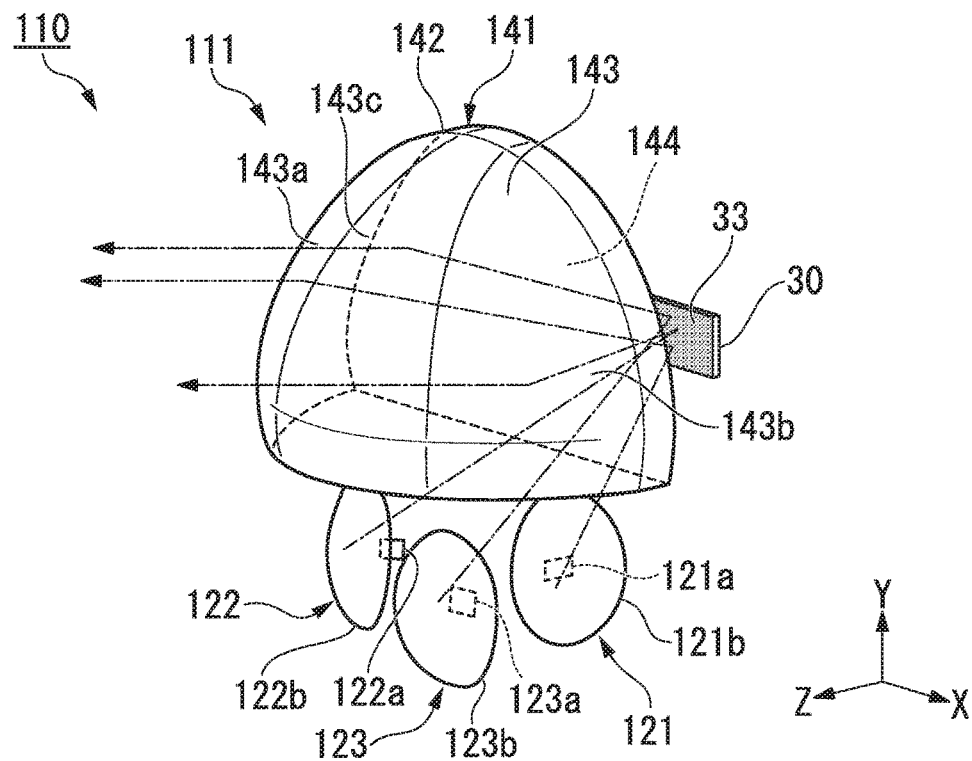
FIG. 11 is a perspective view of a projection module of a second embodiment.

FIG. 11 is a perspective view of a projection module 111 of a vehicle lighting apparatus 110 of a second embodiment.

The projection module 111 of the second embodiment is different mainly in that the projection module 111 has three light source units compared to the first embodiment. The same reference numerals are given to constituents having the same configuration as those of the embodiment described above, and description of the constituents is omitted.

The projection module 111 has a first light source unit 121, a second light source unit 122, a third light source unit 123, a reflection-type digital light deflection device 30, and a projection optical system 141.

The first light source unit 121 has a light source main body 121*a* and a light-focusing optical system 121*b*. The second light source unit 122 has a light source main body 122*a* and a light-focusing optical system 122*b*. The third light source unit 123 has a light source main body 123*a* and a light-focusing optical system 123*b*. The light-focusing optical system 121*b* of the first light source unit 121 and the light-focusing optical system 122*b* of the second light source unit 122 are aligned along the X-axis direction (that is, the rotation movement axis direction of the mirror element 32). The light-focusing optical system 123*b* of the third light source unit 123 is arranged between the light-focusing optical system 121*b* of the first light source unit 121 and the light-focusing optical system 122*b* of the second light source unit 122 along the X-axis direction. The light-focusing optical system 123*b* of the third light source unit 123 is arranged slightly below the light-focusing optical system 121*b* of the first light source unit 121 and the light-focusing optical system 122*b* of the second light source unit 122.

The projection optical system 141 has a lens body 142. The lens body 142 has an incidence surface 144 having a planar shape and an emission surface 143 having a convex shape. The emission surface 143 is zoned into a first emission region 143*a*, a second emission region 143*b*, and a third emission region 143*c*. The first emission region 143*a*, the third emission region 143*c*, and the second emission region 143*b* are aligned in this order along the X-axis direction. That is, the third emission region 143*c* is arranged between the first emission region 143*a* and the second emission region 143*b*. The first emission region 143*a* emits a reflection pattern that is formed, by the reflection-type digital light deflection device 30, of light emitted from the first light source unit 121. The second emission region 143*b* emits a reflection pattern that is formed, by the reflection-type digital light deflection device 30, of light emitted from the second light source unit 122. Similarly, the third emission region 143*c* emits a reflection pattern that is formed, by the reflection-type digital light deflection device 30, of light emitted from the third light source unit 123. The light emitted from the first to third emission regions 143*a*, 143*b*, 143*c* is overlapped on the frontward imaginary screen SC and forms a light distribution pattern.

The vehicle lighting apparatus 110 of the present embodiment has three light source units 121, 122, 123. Thereby, three or more light distribution patterns formed by using the three or more light source units are overlapped with one another, and thereby, it is possible to provide a vehicle lighting apparatus 110 in which the illumination intensity of the light distribution pattern is further increased compared to a case where the vehicle lighting apparatus 110 has two light source units. The present embodiment is described using an example of the vehicle lighting apparatus 110 having three light source units 121, 122, 123; however, the number of light source units may be further increased.

In the vehicle lighting apparatus 110 described above, at least one of the first to third light source units 121, 122, 123 may emit non-visible light. In this case, light emitted from the light source unit that emits the non-visible light can be used for sensing of the frontward direction. Further, it is not necessary to separately provide a non-visible light irradiation device for sensing the frontward direction, and it is possible to achieve a low-cost sensing device.

Third Embodiment

Figure 12:
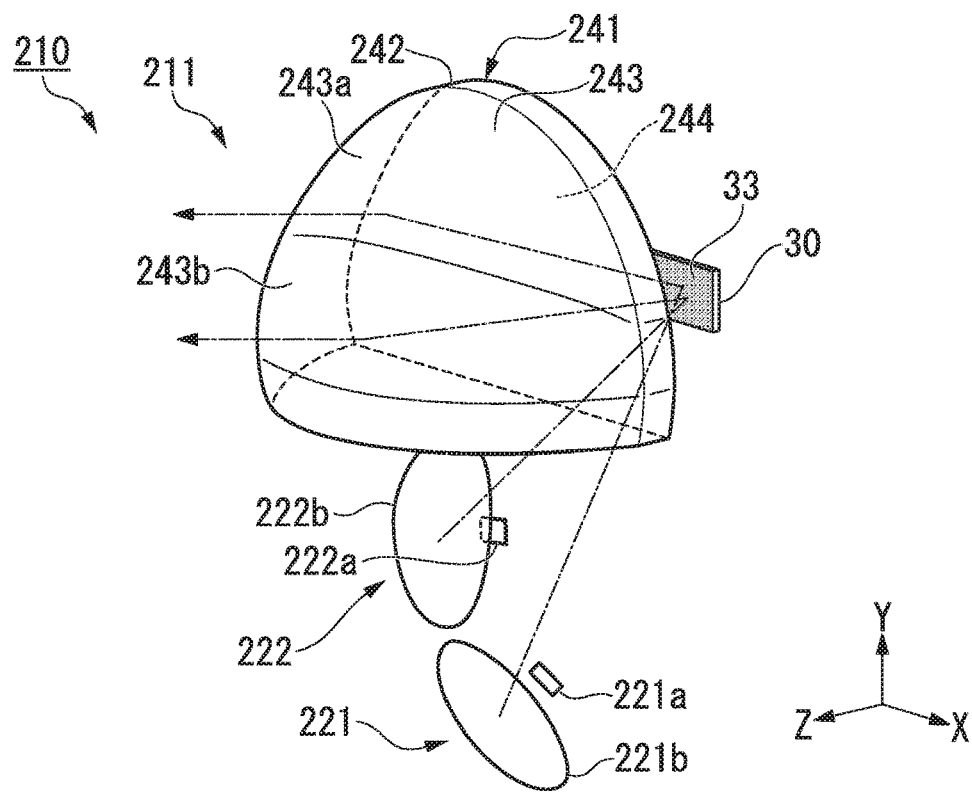
FIG. 12 is a perspective view of a projection module of a third embodiment.

FIG. 12 is a perspective view of a projection module 211 of a vehicle lighting apparatus 210 of a third embodiment.

The projection module 211 of the third embodiment is different mainly in the arrangement of the light source unit compared to the first embodiment. The same reference numerals are given to constituents having the same configuration as those of the embodiment described above, and description of the constituents is omitted.

The projection module 211 has a first light source unit 221, a second light source unit 222, a reflection-type digital light deflection device 30, and a projection optical system 241.

The first light source unit 221 has a light source main body 221*a* and a light-focusing optical system 221*b*. The second light source unit 222 has a light source main body 222a and a light-focusing optical system 222b. The light-focusing optical system 221b of the first light source unit 221 and the light-focusing optical system 222b of the second light source unit 222 are aligned along the vertical direction (Y-axis direction).

The light-focusing optical system 221b of the first light source unit 221 is arranged at a lower position than the light-focusing optical system 222b of the second light source unit 222.

The projection optical system 241 has a lens body 242. The lens body 242 has an incidence surface 244 having a planar shape and an emission surface 243 having a convex shape. The emission surface 243 is zoned into a first emission region 243a and a second emission region 243b that are aligned along the Y-axis direction. The first emission region 243a emits a reflection pattern that is formed, by the reflection-type digital light deflection device 30, of light emitted from the first light source unit 221. The second emission region 243b emits a reflection pattern that is formed, by the reflection-type digital light deflection device 30, of light emitted from the second light source unit 222. The light emitted from the first emission region 243a and the second emission region 243b is overlapped on the frontward imaginary screen SC and forms a light distribution pattern.

Next, the positional relationship among the light-focusing optical system 221b of the first light source unit 221, the light-focusing optical system 222b of the second light source unit 222, and the reflection-type digital light deflection device 30 of the present embodiment is described with reference to FIG. 5. As shown in FIG. 5, the first imaginary plane P1 and the second imaginary plane P2 are defined in the frontward direction of the reflection-type digital light deflection device 30.

In the present embodiment, the light-focusing optical system 221b of the first light source unit 221 and the light-focusing optical system 222b of the second light source unit 222 are arranged in one (lower region A2) of two regions that are zoned by the first imaginary plane P1. The first light source unit 221 and the second light source unit 222 are arranged on the second imaginary plane P2. The projection optical system 241 is arranged in another (upper region A1) of the two regions that are zoned by the first imaginary plane P1.

According to the present embodiment, the light-focusing optical system 221b of the first light source unit 221, the light-focusing optical system 222b of the second light source unit 222, and the projection optical system 241 can be arranged to be aligned along the second imaginary plane P2. Accordingly, each member can be compactly arranged in a direction (that is, the rotation movement axis direction) that is orthogonal to the second imaginary plane P2, and it is possible to achieve a vehicle lighting apparatus 210 having a small dimension.

The present embodiment is described using an example in which two light source units (the first light source unit 221 and the second light source unit 222) are included; however, the vehicle lighting apparatus 210 may have three or more light source units. In this case, as long as at least two of the three or more light source units satisfy the relationship described above, a certain contribution to compactification can be realized.

Fourth Embodiment

Figure 13:
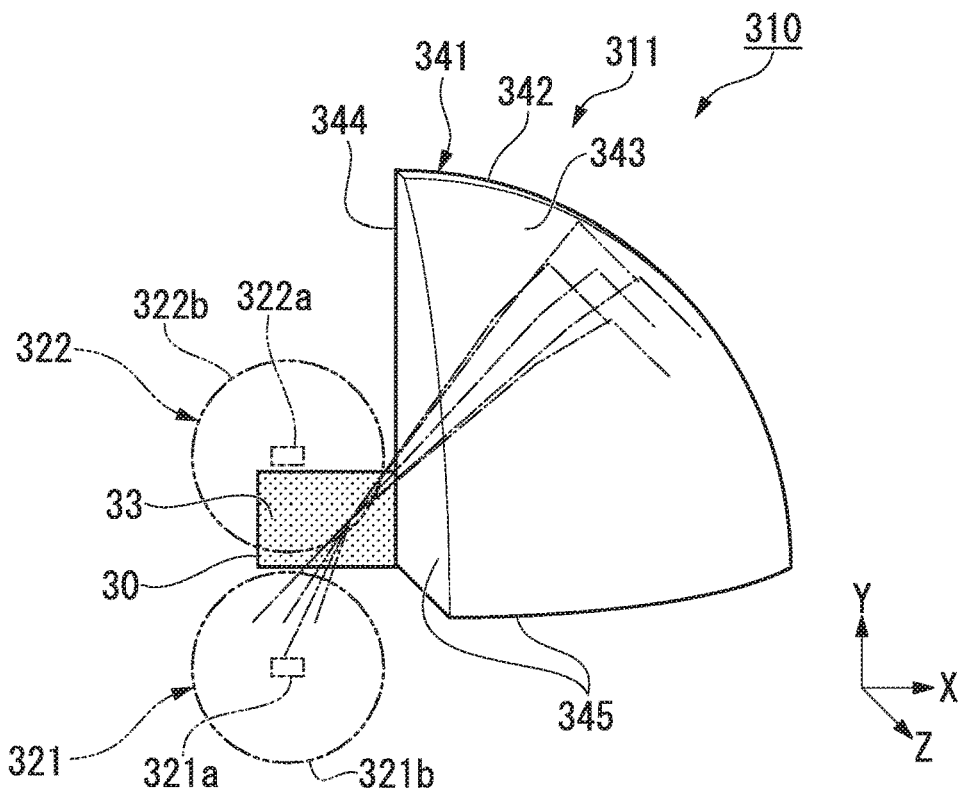
FIG. 13 is a perspective view of a projection module of a vehicle lighting apparatus of a fourth embodiment.
Figure 14:
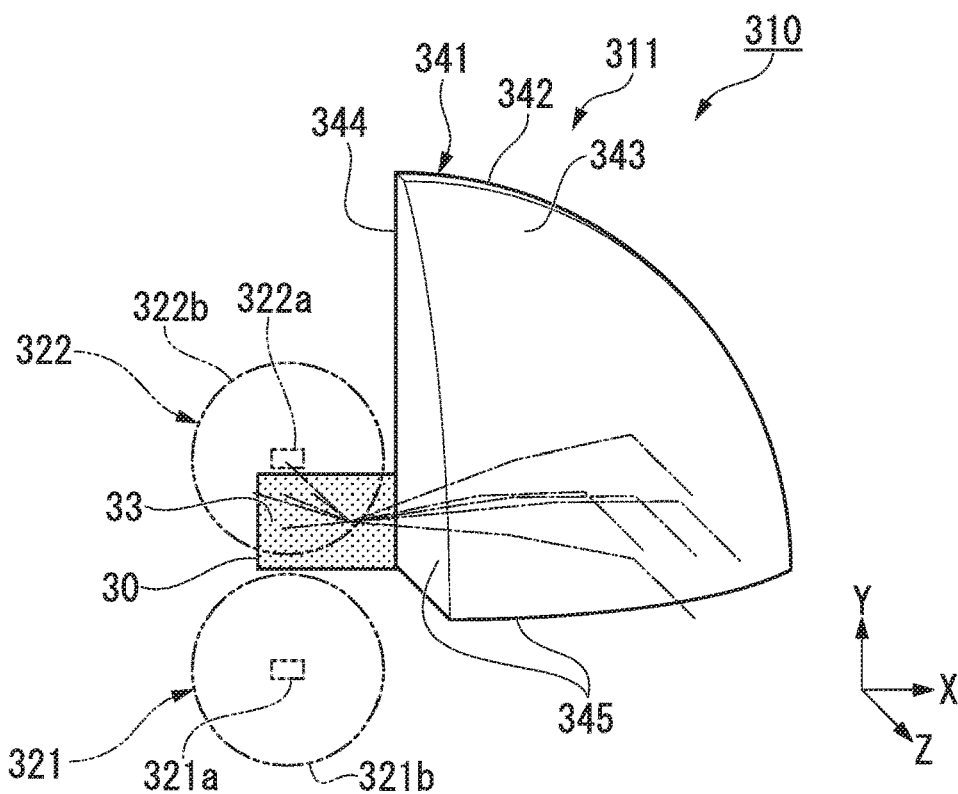
FIG. 14 is a perspective view of the projection module of the vehicle lighting apparatus of the fourth embodiment.

FIG. 13 and FIG. 14 are perspective views of a projection module 311 of a vehicle lighting apparatus 310 of a fourth embodiment. In FIG. 13, an optical path of light that is emitted from a first light source unit 321 is shown. In FIG. 14, an optical path of light that is emitted from a second light source unit 322 is shown.

The projection module 311 of the fourth embodiment is different mainly in the configuration of the light source unit and the projection optical system compared to the first embodiment. The same reference numerals are given to constituents having the same configuration as those of the embodiment described above, and description of the constituents is omitted.

The projection module 311 has a first light source unit 321, a second light source unit 322, a reflection-type digital light deflection device 30, and a projection optical system 341.

The first light source unit 321 has a light source main body 321a and a light-focusing optical system 321b. The second light source unit 322 has a light source main body 322a and a light-focusing optical system 322b. The light-focusing optical system 321b of the first light source unit 321 and the light-focusing optical system 322b of the second light source unit 322 are aligned along the vertical direction (Y-axis direction).

The light-focusing optical system 321b of the first light source unit 321 is arranged at a lower position than the light-focusing optical system 322b of the second light source unit 322.

The projection optical system 341 has a lens body 342. The lens body 342 has an incidence surface 344 having a planar shape and an emission surface 343 having a convex shape. A notch part 345 is provided on the lens body 342. That is, the lens body 342 is formed in a shape that includes a notched part in plan view. The notch part 345 is arranged at each of a position on the −Y-axis side and a position on the −X-axis side of the lens body 342. The light-focusing optical system 321b of the first light source unit 321 and the light-focusing optical system 322b of the second light source unit 322 are arranged at the notch part 345.

Next, the positional relationship among the light-focusing optical system 321b of the first light source unit 321, the light-focusing optical system 322b of the second light source unit 322, and the reflection-type digital light deflection device 30 of the present embodiment is described with reference to FIG. 5. As shown in FIG. 5, the first imaginary plane P1 and the second imaginary plane P2 are defined in the frontward direction of the reflection-type digital light deflection device 30. In the present embodiment, the light-focusing optical system 321b of the first light source unit 321 and the light-focusing optical system 322b of the second light source unit 322 are arranged in the right region A3. The light-focusing optical system 321b of the first light source unit 321 is arranged in the lower region A2. The light-focusing optical system 322b of the second light source unit 322 is arranged in the upper region A1. The projection optical system 341 is arranged in a region in which the upper region A1 and the left region A4 are overlapped with each other.

According to the present embodiment, the first light source unit 321, the second light source unit 322, and the projection optical system 341 can be compactly arranged in the frontward direction of the reflection-type digital light deflection device 30. Thereby, it is possible to downsize the vehicle lighting apparatus 310.

Fifth Embodiment

Figure 15:
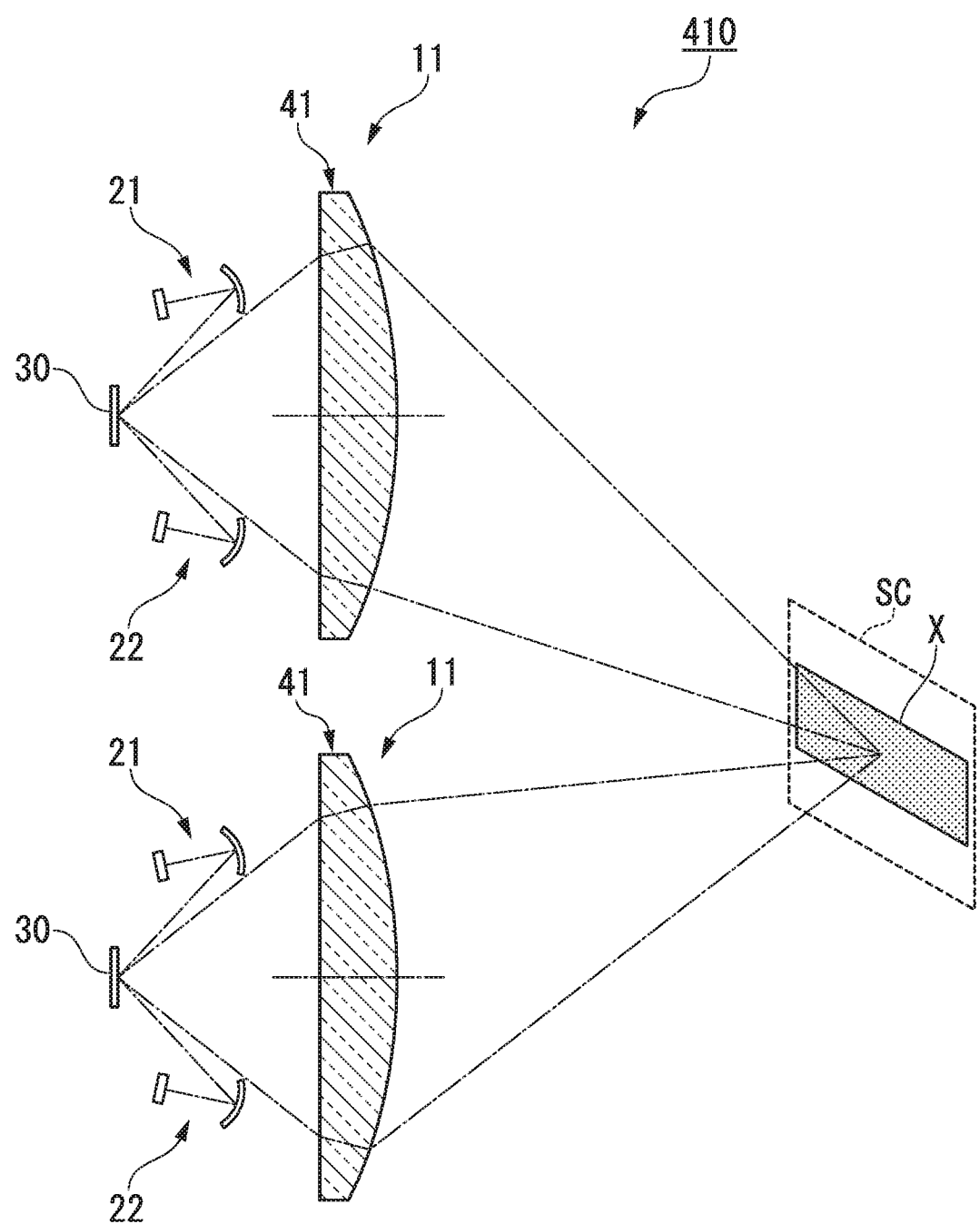
FIG. 15 is a schematic view showing a vehicle lighting apparatus of a fifth embodiment.

FIG. 15 is a schematic view showing a vehicle lighting apparatus 410 of a fifth embodiment.

The vehicle lighting apparatus 410 of the fifth embodiment has two projection modules 11, a control device 13 (not shown), and an imaging device 15 (not shown). The vehicle lighting apparatus 410 of the present embodiment is different from the first embodiment in that the vehicle lighting apparatus 410 has two projection modules 11. The same reference numerals are given to constituents having the same configuration as those of the embodiment described above, and description of the constituents is omitted.

In the vehicle lighting apparatus 410, light distribution patterns formed on a frontward imaginary screen SC by the two projection modules 11 overlap with each other to form one light distribution pattern X. Therefore, it is possible to change the shape of an illumination region of the vehicle lighting apparatus 410 by the reflection-type digital light deflection device 30, and the illumination intensity can be increased by overlapping a plurality of light distribution patterns with each other. Thereby, it is possible to freely change the illumination intensity distribution of each part in the light distribution pattern X.

Although a variety of embodiments of the invention have been described, each configuration, the combination of configurations, and the like in the embodiments are examples, and addition, omission, and substitution of the configuration and other changes can be made without departing from the scope of the invention. The invention is not limited by the embodiment.

For example, in the embodiment having two light source units (first and second light source units) of the embodiments described above, a configuration may be employed in which another light source unit (third light source unit, fourth light source unit . . . ) is added.

The invention claimed is:

1. A vehicle lighting apparatus that illuminates a frontward direction of a vehicle, the apparatus comprising:
   first and second light source units each having a light source main body and a light-focusing optical system that focuses light emitted from the light source main body;
   a reflection-type digital light deflection device that is configured by arranging a plurality of mirror elements along an arrangement plane each of which can be slanted around a rotation movement axis and each of which can be individually switched between a first slanted state and a second slanted state and that reflects the light, focused by the first and second light source units, by the mirror element of the first slanted state to form a reflection pattern; and
   a projection optical system that illuminates a frontward direction with light reflected by the reflection-type digital light deflection device,
   wherein light incident on the reflection-type digital light deflection device by the first and second light source units is overlapped,
   the projection optical system has a lens body that irradiates a frontward imaginary screen with light from the reflection-type digital light deflection device, and the lens body has an incidence surface and an emission surface,
   the reflection-type digital light deflection device is positioned on a rear side of the projection optical system, and a reflection control surface of the reflection-type digital light deflection device faces the incidence surface,
   the first and second light source units are positioned below the projection optical system and focus light on the reflection control surface,
   the first and second light source units are aligned in a left-and-right direction or an upward-and-downward direction,
   each of the plurality of mirror elements is slanted at a first slant angle with respect to the arrangement plane in the first slanted state and is slanted at a second slant angle with respect to the arrangement plane in the second slanted state, and the first slant angle and the second slant angle have substantially the same absolute value and a different positive/negative sign from each other,
   each of the plurality of mirror elements reflects light emitted from the first and second light source units toward the projection optical system in the first slanted state, and light reflected by a mirror element of the plurality of mirror elements in the first slanted state forms a predetermined reflection pattern,
   each of the plurality of mirror elements emits light emitted from the first and second light source units toward a light shield member in the second slanted state,
   the emission surface is directed in the frontward direction and projects, in the frontward direction, reflection light that is formed, by the reflection-type digital light deflection device, of light emitted from the first light source unit and that is incident on the incidence surface, and reflection light that is formed, by the reflection-type digital light deflection device, of light emitted from the second light source unit and that is incident on the incidence surface, and
   light emitted from the first light source unit and emitted from the emission surface and light emitted from the second light source unit and emitted from the emission surface are overlapped on the frontward imaginary screen and form a light distribution pattern.

2. The vehicle lighting apparatus according to claim 1, wherein an area of an illumination region of light that is incident on the reflection-type digital light deflection device by the first light source unit is larger than an area of an illumination region of light that is incident on the reflection-type digital light deflection device by the second light source unit.

3. The vehicle lighting apparatus according to claim 2, wherein the light source main body of the first light source unit is a light-emitting diode light source, and the light source main body of the second light source unit is a laser light source.

4. The vehicle lighting apparatus according to claim 2, wherein an image magnification ratio of the light-focusing optical system of the first light source unit is larger than an image magnification ratio of the light-focusing optical system of the second light source unit.

5. The vehicle lighting apparatus according to claim 1, wherein a first imaginary plane that passes through a center of the reflection-type digital light deflection device and that is in parallel with the rotation movement axis of the mirror element and a normal direction of the mirror element of the ON slanted state is set, and wherein the light-focusing optical systems of the first and second light source units are arranged in one of two regions that are zoned by the first imaginary plane, and the projection optical system is arranged in another of the two regions that are zoned by the first imaginary plane.

6. The vehicle lighting apparatus according to claim 5, wherein a second imaginary plane that passes through the center of the reflection-type digital light deflection device and that is orthogonal to the first imaginary plane is set,
wherein the light-focusing optical system of the first light source unit is arranged in one of two regions that are zoned by the second imaginary plane, and the light-focusing optical system of the second light source unit is arranged in another of the two regions that are zoned by the second imaginary plane, and
wherein the first and second light source units are aligned in the left-and-right direction.

7. The vehicle lighting apparatus according to claim 5, wherein a second imaginary plane that passes through the center of the reflection-type digital light deflection device and that is orthogonal to the first imaginary plane is set,
the light-focusing optical systems of the first and second light source units are arranged on the second imaginary plane, and
the first and second light source units are aligned in the upward-and-downward direction.

8. The vehicle lighting apparatus according to claim 1, wherein the projection optical system has a lens body having a shape that includes a notched part in plan view, and
the light-focusing optical system is arranged at the notched part.

9. The vehicle lighting apparatus according to claim 1, comprising
three or more light source units each having a light source main body and a light-focusing optical system that focuses light emitted from the light source main body.

10. The vehicle lighting apparatus according to claim 1, wherein at least one of the light source units emits non-visible light.

11. The vehicle lighting apparatus according to claim 1, comprising
a control part that controls a slant mode of the mirror element of the reflection-type digital light deflection device in response to travel circumstances of the vehicle.

12. The vehicle lighting apparatus according to claim 1, comprising
an object detection part that detects an object which is present at a frontward position of the vehicle,
wherein the control part controls a slant mode of the mirror element of the reflection-type digital light deflection device based on a detection condition of the object detection part.

13. The vehicle lighting apparatus according to claim 1, wherein the rotation movement axis of each of the plurality of mirror elements at the time of being switched between the first slanted state and the second slanted state extends in parallel with the left-and-right direction.

14. The vehicle lighting apparatus according to claim 9, wherein the rotation movement axis of each of the plurality of mirror elements at the time of being switched between the first slanted state and the second slanted state extends in parallel with the left-and-right direction.

15. The vehicle lighting apparatus according to claim 14, wherein a focal length of the light-focusing optical system of the first light source unit is matched with a focal length of the light-focusing optical system of the second light source unit, and
a distance to the light-focusing optical system of the first light source unit from the reflection-type digital light deflection device is matched with a distance to the light-focusing optical system of the second light source unit from the reflection-type digital light deflection device.

16. The vehicle lighting apparatus according to claim 1, comprising
a third light source unit having a light source main body and a light-focusing optical system that focuses light emitted from the light source main body,
wherein each of the plurality of mirror elements reflects light emitted from the first, second and third light source units toward the projection optical system in the first slanted state, and light reflected by a mirror element of the plurality of mirror elements in the first slanted state forms a predetermined reflection pattern,
each of the plurality of mirror elements emits light emitted from the first, second and third light source units toward the light shield member in the second slanted state,
the emission surface is directed in the frontward direction and projects, in the frontward direction, reflection light that is formed, by the reflection-type digital light deflection device, of light emitted from the first light source unit and that is incident on the incidence surface, reflection light that is formed, by the reflection-type digital light deflection device, of light emitted from the second light source unit and that is incident on the incidence surface, and reflection light that is formed, by the reflection-type digital light deflection device, of light emitted from the third light source unit and that is incident on the incidence surface, and
light emitted from the first light source unit and emitted from the emission surface, light emitted from the second light source unit and emitted from the emission surface and light emitted from the third light source unit and emitted from the emission surface are overlapped on the frontward imaginary screen and form a light distribution pattern.

17. The vehicle lighting apparatus according to claim 16, wherein the light source main bodies of the first and second light source units are light-emitting diode light sources, and
the light source main body of the third light source unit is a laser light source.

18. The vehicle lighting apparatus according to claim 16, wherein the light source main bodies of the first and second light source units are laser light sources, and
the light source main body of the third light source unit is a light-emitting diode light source.

19. The vehicle lighting apparatus according to claim 17, wherein the third light source unit is positioned between the first and second light source units.

20. The vehicle lighting apparatus according to claim 18, wherein the third light source unit is positioned between the first and second light source units.

* * * * *